United States Patent [19]

Suzuki et al.

[11] Patent Number: 4,562,486
[45] Date of Patent: Dec. 31, 1985

[54] CONVERSION OF MULTILEVEL DIGITAL DATA TO BINARY DATA

[75] Inventors: Kazuhiro Suzuki, Suntou; Noboru Murayama, Tokyo, both of Japan

[73] Assignee: Ricoh Company, Ltd., Japan

[21] Appl. No.: 496,660

[22] Filed: May 20, 1983

[30] Foreign Application Priority Data

May 21, 1982 [JP] Japan ................................. 57-86108

[51] Int. Cl.⁴ .............................................. H04N 1/40
[52] U.S. Cl. ..................................... 358/282; 382/50; 382/53
[58] Field of Search ....................... 358/262, 280, 282; 382/50, 53

[56]  References Cited
U.S. PATENT DOCUMENTS 4,468,703  8/1984  Fujiwara et al. ................... 358/282

OTHER PUBLICATIONS

E. H. Schroeder, Threshold Detector, I.B.M. Technical Disclosure Bulletin, vol. 24, No. 4, 9/81.

Primary Examiner—Edward L. Coles, Sr.
Attorney, Agent, or Firm—Guy W. Shoup

[57] ABSTRACT

A system for converting a multilevel video signal into a binary video signal for use in an image processing machine such as a facsimile machine or digital copier includes a threshold setting circuit which first determines average density levels of a predetermined number of scanning lines and then a digitally weighted average of these average density levels, said digitally weighted average being used as a threshold for the binary conversion processing.

7 Claims, 6 Drawing Figures

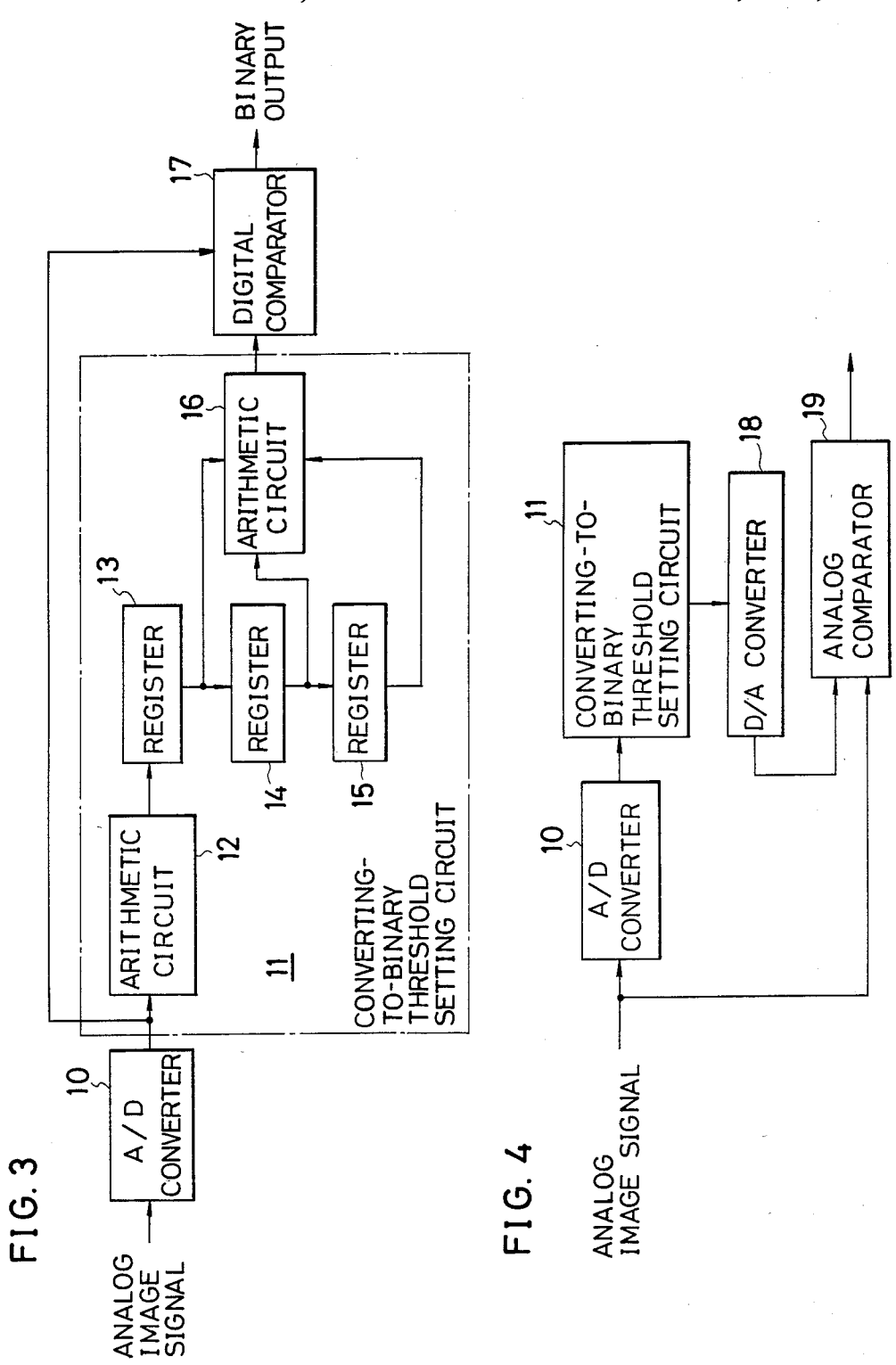

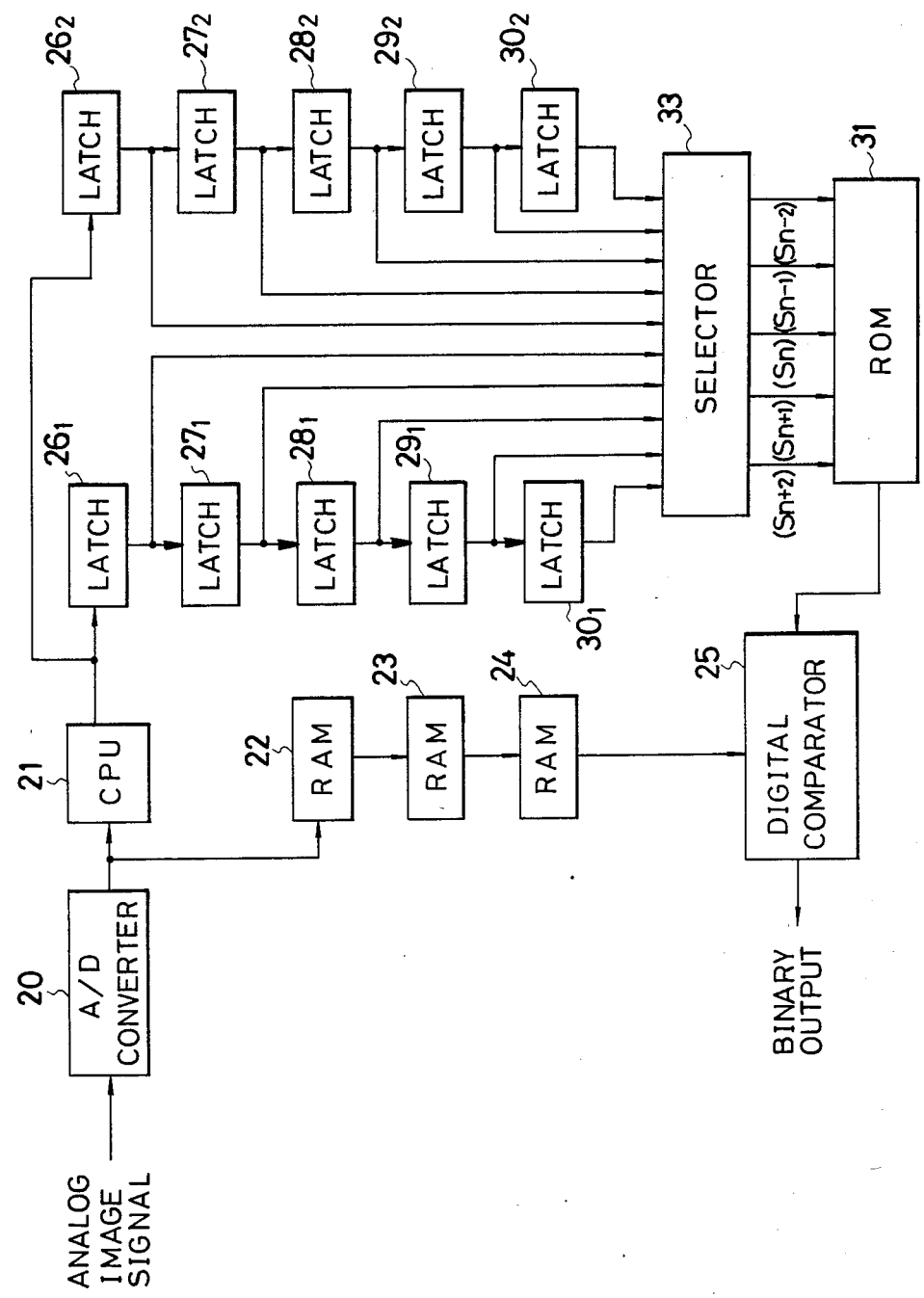

CONVERSION OF MULTILEVEL DIGITAL DATA TO BINARY DATA

BACKGROUND OF THE INVENTION

1. Field of the Invention

This invention generally relates to image processing technology, and, in particular, to a system for converting a multilevel digital data into binary data with the use of thresholding technique. More specifically, the present invention relates to a system for converting a multilevel digital or analog video signal into a binary video signal suitable for use in image processing machines such as facsimile machines, digital copiers and optical readers.

2. Description of the Prior Art

FIG. 1 shows a typical prior art system for converting an analog video signal into a binary video signal. As shown, analog video signal (a) obtained by scanning an original with a photoelectric image sensor such as a CCD scanner is input to a peak detector 1 which then supplies as its output a peak level voltage signal (b). Then, the peak level voltage signal (b) is divided into approximately half by means of a voltage divider 2, and such a divided voltage signal (c) is then supplied to a comparator 3. Using the divided voltage signal (c) as a threshold for conversion to binary data, the comparator 3 processes the analog signal (a) thereby providing a binary converted video signal (d) as its output. FIG. 2 is a time chart showing the relation between the various signals indicated in FIG. 1. As is obvious from this time chart, in accordance with the above-described prior art system, since the threshold level is determined in an analog manner, it is extremely difficult to determine the threshold value by taking into account the density average of one or more of the previous scanning lines. As a result, some delicate information tends to be lost when converted into binary video data. For example, as best shown in FIG. 2, a collection of thin lines A would be converted into a single fat line and pale or faint lines B and C would disappear completely.

SUMMARY OF THE INVENTION

The above-described disadvantages of the prior art are overcome with the present invention and an improved system for converting a multilevel digital video signal into a binary video signal is provided. In accordance with the present invention, among a plurality of scanning lines, including the current scanning line and other scanning lines in its vicinity, to obtain a binary video signal therefrom, predetermined two or more scanning lines are selected to obtain a weighted average in video signal level. Using the thus obtained weighted average or the weighted average multiplied by a certain proportionality constant as a threshold level for binary conversion, a multilevel video signal is converted into a binary video signal.

Therefore, it is a primary object of the present invention to provide an improved system for converting a multilevel video signal, analog or digital, into a binary video signal.

Another object of the present invention is to provide a binary video signal conversion system which is minimized in losing information during binary conversion.

A further object of the present invention is to provide a system for converting a multilevel video signal into a binary video signal which is least susceptible to the density level of the background of an original being scanned.

A still further object of the present invention is to provide a system for converting a multilevel video signal into a two-valued video signal without losing information for thin or pale lines.

Other objects, advantages and novel features of the present invention will become apparent from the following detailed description of the invention when considered in conjunction with the accompanying drawings.

BRIEF DESCRIPTION OF THE DRAWINGS

FIGS. 3 through 6 are block diagrams showing several embodiments constructed in accordance with the principle of the present invention.

DESCRIPTION OF THE PREFERRED EMBODIMENTS

Figure 1:
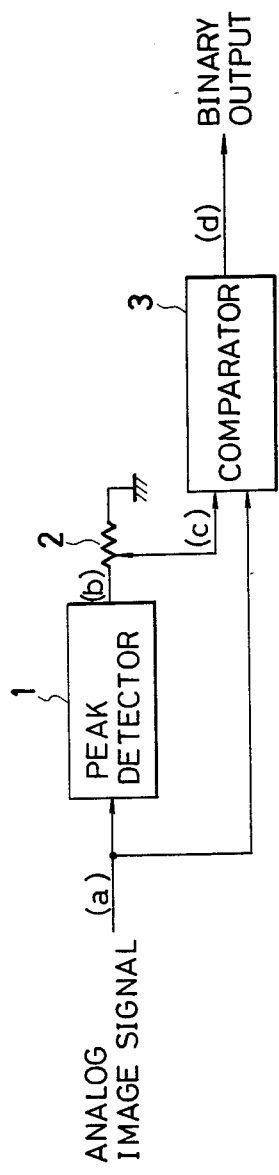
FIG. 1 is a schematic diagram showing a typical prior art system for converting a multilevel video signal into a binary video signal.
Figure 2:
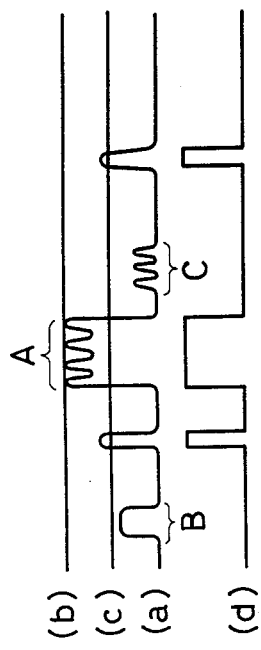
FIG. 2 is a timing chart showing various signals appearing in the system of FIG. 1.

Referring now to FIG. 3, there is shown one embodiment of the system for converting a multilevel video signal into a binary video signal constructed in accordance with the present invention. As shown, the system of FIG. 3 includes an analog-to-digital converter 10 which receives an analog video signal, for example, from an image sensor such as a CCD image sensor (not shown) which scans an original to be optically read, a converting-to-binary threshold setting circuit 11 and a digital comparator 17. The setting circuit 11 contains an arithmetic circuit 12 having its input connected to the output of the A/D converter 10 and also to the digital comparator 17. The output of the arithmetic circuit 12 is connected to the first stage of a three stage register set including registers 13 through 15, whose outputs are all connected to another arithmetic circuit 16, which, in turn, is connected to the input of the digital comparator 17.

In operation, when the analog image signal is supplied to the A/D converter 10, it is converted into, for example, 4-bit multilevel digital video signal, which is then supplied to the digital comparator 17 where the 4-bit multilevel digital video signal is compared with a threshold for conversion to binary data to produce a two-valued video signal which is a conversion from the analog video signal of an original. The threshold for binary conversion is appropriately determined by the setting circuit 11 for each scanning line in the form of a digital value.

In the converting-to-binary threshold setting circuit 11, the digitalized multilevel video signal is processed at the arithmetic circuit 12 such that the density level of each pixel (picture element) in a single scanning line is cumulatively summed and the sum is divided by the number of pixels in the scanning line to obtain an averaged density level. Then the thus obtained average value is fed into the top register 13. Thereafter, when the average density level for the next scanning line has been obtained and fed into the top register 13, the contents thus far present in the top register 13 is shifted to the middle register 14. In this manner, as the scanning proceeds from one scanning line to another, the contents (averaged density level) in the registers 13–15 are shifted to the next stages.

Accordingly, if the scanning is being carried out for the nth scanning line, the averaged density levels for the (n−1)th, (n−2)th and (n−3)th scanning lines are stored in the top, middle and bottom registers 3-15, respectively. The second arithmetic circuit 16 is connected to receive outputs, or three averaged density levels contained in the registers 13–15 and it processes these three values to obtain a weighted average. For example, a weighted average value is obtained such that a first weighting factor of 0.5 is multiplied to the output from the top register 13, a weighting factor of 0.3 is multiplied to the output from the middle register 14 and a weighting factor of 0.2 is multiplied to the output from the bottom register 15. Then the thus obtained weighted average is supplied to the digital comparator 17 where the conversion of the multilevel video data of the nth scanning line to binary video data takes place using the weighted average thus supplied as a thresholding level. It is to be noted that, if desired, any appropriate number may be multiplied to the weighted average as a proportionality constant before supplying the weighted average to the digital comparator 17. In this case, multiplication by a proportionality constant may be carried out at the second arithmetic circuit 16.

In the system shown in FIG. 3, the first arithmetic circuit 12 of the threshold setting circuit 11 may be so structured that when it determines an average density level for each scanning line it takes into account the density levels of all of the pixels in each scanning line or some of the pixels in each scanning line, e.g., every several or several tens of pixels in a single scanning line. Furthermore, in determining an average density level of video signal for each scanning line, it may also be so structured that those pixels whose density levels exceed predetermined upper and lower limits are excluded from consideration. These upper and lower limits may be arbitrarily determined; for example, with the density level of a white area being taken for 100%, the upper limit for black may be set at 15% and the lower limit for white may be set at 85%.

FIG. 4 shows another embodiment of the present invention, which is basically the same in structure as the system shown in FIG. 3 except that use is made of an analog comparator 19 instead of the digital comparator 17 of FIG. 3 and a digital-to-analog converter 18 is inserted between the threshold setting circuit 11 and the analog comparator 19. Moreover, since use is made of the analog comparator 19, the analog video signal from an image sensor (not shown) is directly supplied to one input of the analog comparator 19.

Figure 5:
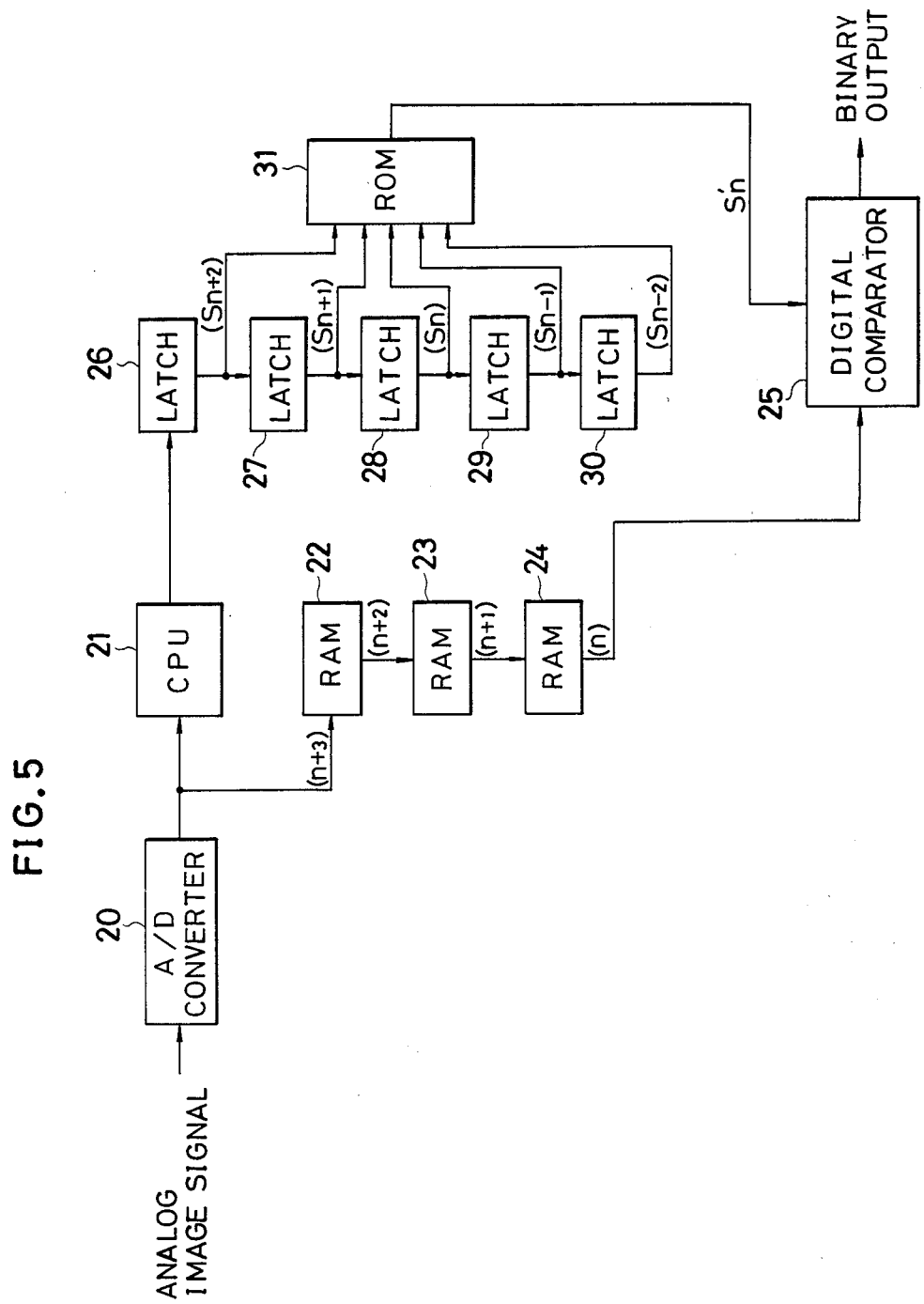

FIG. 5 shows a further embodiment of the present invention. As shown, this embodiment includes an A/D converter 20 which is connected to receive an analog video signal as its input from an image sensor and which is connected to supply its output to a central processing unit, or simply CPU, 21 and also to a first stage random access memory, or simply RAM, 22 of a three stage RAM 22-24. For example, the analog video signal is converted into a multilevel digital video data of, for example, 4 bits by the A/D converter 20. Each stage of the three stage RAM 22-24 stores a digitized video signal for a single scanning line, and each time when the first stage RAM 22 receives a new data from the A/D converter 20, the data is shifted to the next stage RAM. Stated more in detail, if the first stage RAM 22 receives a new data from the A/D converter 20 under the condition that the RAMs 22-24 are currently storing digitized video data for scanning lines (n+2), (n+1) and n, respectively, the data in the RAM 22 is shifted to the RAM 23 and the data in the RAM 23 is shifted to the RAM 24 with the data in the RAM 24 being supplied as an input to a digital comparator 25. In other words, a digitized video data is delayed by the time period required to scan three scanning lines before being supplied to the digital comparator 25.

As described previously, the output of the A/D converter 20 is also connected to the input of the CPU 21, which samples every pixel or every predetermined number of pixels in each scanning line and processes them to determine an average of the density levels of the sampled pixels in accordance with a program stored therein. The CPU 21 is connected to supply its output to a first stage latch 26, which forms an element of a five-stage latch combination. These latches 26–30 are serially connected in the form of a ladder so that the data in a particular latch is shifted to the next latch when a new data is introduced into the first stage latch 26. Each of the latches 26–30 has its output connected to the input of the next following latch except the last stage latch 30 and also to the corresponding input of a read only memory, or simply ROM, 31. As mentioned before, upon scanning of a particular scanning line, the average data calculated by the CPU 21 is fed into the first stage latch 26. Thus, if the new data being supplied to the first stage latch 26 is for the (n+3)th scanning line, the latches 26-30 store data for (n+2), (n+1), n, (n−1) and (n−2) scanning lines, respectively.

Let us suppose that the multilevel digital video signal for nth scanning line stored in the last stage RAM 24 is about to be supplied to the digital comparator 25. Under the condition, the latches 26-30 store therein averaged density levels $S_{n+2}$-$S_{n-2}$ for (n+2)th–(n−2)th scanning lines, respectively. As a result, the averaged density levels of the two immediately preceding scanning lines, i.e., (n−2)th and (n−1)th lines, and the two immediately following scanning lines, i.e., (n+1)th and (n+2)th lines, together with the averaged density level of the nth scanning line whose multilevel digital signal is to be processed into a binary video signal, are fed into the ROM 31. It is to be noted that a program for calculating a weighted average $S_n'$ of the average density levels $S_{n+2}$ through $S_{n-2}$ supplied from the latches 26 through 30, respectively, is stored in the ROM 31. In other words, the weighted average is determined by the following equation.

$$S_n' = aS_n + bS_{n-1} + cS_{n+1} + dS_{n-2} + eS_{n+2}$$

where a, b, c, d and e are weighting factors. Accordingly, when the multilevel digital video signal of the nth scanning line is supplied as an input to the digital comparator 25, the weighted average $S_n'$ is also supplied to the digital comparator 25 as a threshold value to be used for converting the multilevel digital video signal into a binary data.

Similarly with the previous case, the CPU 21 may be provided with a function of discarding excessive data beyond predetermined upper and lower limits in calculating an averaged density level for each scanning line. Furthermore, in the preferred embodiment, either the CPU 21 or the ROM 31 may be so structured to check appropriateness of the resulting weighted average as a threshold to be used in the binary conversion processing for each scanning line, and, if found inappropriate, to use the threshold of the previous scanning line or a predetermined constant threshold as a substitute temporarily. This is because, when all white or all black scanning lines appear consecutively, the resulting weighted average determined by the ROM 31 may be inappropriate in some cases. In this case, the CPU 21 or the ROM 31 may store a program to check whether the resulting weighted average stays within a predetermined appropriate range as a threshold to be used in the binary conversion processing at the digital comparator 25.

As a further modification to the system of FIG. 5, the digital comparator 25 may be substituted by an analog comparator in a manner similar to the previously described embodiment. In such a case, a D/A converter must be provided to the connection between the RAM 24 and such an analog comparator and also to the connection between the ROM 31 and such an analog comparator.

All of the above described embodiments are structured such that a threshold is determined for each scanning line. However, the present invention may also be applied to the situation in which a scanning line is divided into a plurality of blocks and a threshold is determined for each of the blocks. An embodiment of the present invention when applied to such a situation is illustratively shown in FIG. 6, in which identical numerals are used to indicate identical elements with reference to the embodiment of FIG. 5.

As shown in FIG. 6, the overall structure of FIG. 6 is similar to that of FIG. 5, but the embodiment of FIG. 6 includes an additional latch ladder and a selector 33. In this particular embodiment, the CPU 21 produces two averages of density levels, one for the first half section (block #1) and the other for the last half section (block #2) of a single scanning line. That is, when the CPU 21 determines a density level average for the first half section of a particular scanning line, it is latched into the latch $26_1$. Then, the CPU determines another density level average for the last half section, and its value is latched into the latch $26_2$. In this manner, averaged values of density level for the first half sections of scanning lines are shifted along the latches $26_1$ through $30_1$; on the other hand, those values for the second half sections are shifted along the latches $26_2$ through $30_2$. Then, when the multilevel digital video signal for the first half section of a particular scanning line is supplied to the digital comparator 25 from the RAM 24, the selector 33 permits the data to be supplied from the latches $26_1$ through $30_1$ to the ROM 31; on the other hand, when the multilevel digital video signal for the second half section is supplied to the digital comparator 25 from the RAM 24, the selector 33 permits the data to be supplied to the ROM 31 only from the latches $26_2$ through $30_2$. In this manner, in accordance with this embodiment, two thresholds are determined for the first and second halves of a single scanning line. It should however be noted that a scanning line may be divided more finely.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A system for converting multilevel video data into binary video data using an adjustable threshold, comprising:

analog-to-digital converting means for converting analog video data obtained by scanning an original into multilevel video data;

threshold setting means connected to receive said multilevel digital video data for setting a threshold by taking a digitally weighted average of at least two averaged image densities each determined for each scanning line, said threshold setting means including a first arithmetic unit for determining an average image density for a single scanning line, a memory unit for storing two or more average image densities determined by said first arithmetic unit and a second arithmetic unit for determining a digitally weighted average of a predetermined number of average image densities stored in said memory unit, whereby said second arithmetic unit supplies said digitally weighted average as a threshold to be set; and binary converting means for converting said multilevel video data into binary video data using said digitally weighted average as a threshold.

2. A system of claim 1 wherein said binary converting means includes a digital comparator which is connected to receive said digitally weighted average from said threshold setting means as a threshold to be used in the binary conversion processing and to receive said multilevel digital video data as an input to be converted into binary video data using said threshold.

3. A system of claim 1 wherein said binary converting means includes an analog comparator connected to receive said analog video data as an input to be converted into binary video data and digital-to-analog converter for converting said digitally weighted average into an analog quantity before being supplied to said analog comparator as a threshold to be used in the binary conversion processing.

4. A system of claim 1 further comprising delaying means for delaying the supply of said multilevel video data to be converted into binary video data to said binary converting means.

5. A system of claim 4 wherein said delaying means includes a storing unit which temporarily stores said multilevel video data to be converted into binary video data and supplies it to said binary converting means after scanning a predetermined number of scanning lines.

6. A system for converting multilevel video data into binary video data using an adjustable threshold, comprising:

analog-to-digital converter means for converting analog video data obtained by scanning an original into multilevel digital video data;

threshold setting means connected to receive said multilevel digital video data for setting a threshold by taking a digitally weighted average of at least two averaged image densities each determined for each scanning line, said threshold setting means including a first processing unit for receiving said multilevel digital video data for determining an average image density of each scanning line, a plurality of serially connected latches each storing said average image density and a second processing unit connected to receive average image densities from said plurality of latches to determine a digitally weighted average of the average image densities;

binary converting means for converting said multilevel video data into binary video data using said digitally weighted average as a threshold; and delaying means for delaying the supply of said multilevel video data to be converted into binary video data to said binary converting means.

7. A system for converting multilevel video data into binary video data using an adjustable threshold, comprising:

analog-to-digital converting means for converting analog video data obtained by scanning an original into multilevel digital video data;

threshold setting means connected to receive said multilevel digital video data for setting a threshold by taking a digitally weighted average of at least two averaged image densities each determined for each scanning line, said threshold setting means including a first processing unit for receiving said multilevel digital video data for determining at least two average image densities for predetermined sections of each scanning line, at least two sets of serially connected latches each set including a predetermined number of serially connected latches for each predetermined section of scanning line each latch storing said average image density of the corresponding section, a selector for allowing to pass the information from a selected set of serially connected latches and a second processing unit connected to said selector to determine a digitally weighted average based on the information supplied through said selector from said selected set of serially connected latches;

binary converting means for converting said multilevel video data into binary video data using said digitally weighted average as a threshold; and delaying means for delaying the supply of said multilevel video data to be converted into binary video data to said binary converting means.

* * * * *